(12) United States Patent
Schmidl et al.

(10) Patent No.: US 6,856,610 B2
(45) Date of Patent: Feb. 15, 2005

(54) WIRELESS CODE DIVISION MULTIPLE ACCESS COMMUNICATIONS SYSTEM WITH CHANNEL ESTIMATION USING FINGERS WITH SUB-CHIP SPACING

(75) Inventors: Timothy M. Schmidl, Dallas, TX (US); Srinath Hosur, Plano, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 925 days.

(21) Appl. No.: 09/792,111

(22) Filed: Feb. 23, 2001

(65) Prior Publication Data

US 2001/0038617 A1 Nov. 8, 2001

Related U.S. Application Data

(60) Provisional application No. 60/185,326, filed on Feb. 28, 2000.

(51) Int. Cl.[7] .............................................. H04B 7/216
(52) U.S. Cl. ........................ 370/335; 370/342; 375/130
(58) Field of Search ................................ 370/335, 342, 370/320; 455/422.1; 375/148, 144, 150, 267, 345–347, 349, 130–153

(56) References Cited

U.S. PATENT DOCUMENTS

| | | | | |
|---|---|---|---|---|
| 5,648,983 A | * | 7/1997 | Kostic et al. ................ | 375/150 |
| 5,734,674 A | * | 3/1998 | Fenton et al. ................ | 375/150 |
| 6,442,193 B1 | * | 8/2002 | Hirsch ......................... | 375/147 |
| 6,804,311 B1 | * | 10/2004 | Dabak et al. ................ | 375/347 |
| 2001/0038663 A1 | * | 11/2001 | Medlock ...................... | 375/142 |

* cited by examiner

Primary Examiner—Ricky Ngo
Assistant Examiner—Jesse Alexander
(74) Attorney, Agent, or Firm—Ronald O. Neerings; Wade James Brady, III; Frederick J. Telecky, Jr.

(57) ABSTRACT

A wireless communication network (10). The network comprises a wireless receiver (14). The receiver comprises at least one antenna ($AT_{14}$) for receiving a plurality of frames in a form of a plurality of paths. Each of the plurality of frames is modulated by a plurality of chips, and chip in the plurality of chips has a like chip duration. The receiver further comprises a plurality of path resources ($F_1$, $F_2$), and this plurality of path resources comprises a first path resource ($F_1$) configured to receive a first plurality of symbols from a first path in the plurality of paths and a second path resource ($F_2$) configured to receive a second plurality of symbols from a second path in the plurality of paths. The plurality of path resources also comprises circuitry for sampling the second path at a time less than the chip duration from a time when the circuitry for sampling samples the first path. Still further, the plurality of path resources comprise circuitry ($44_2$, $46_1$), responsive to the circuitry for sampling, for establishing a first channel estimate for the first path in response to the first path and the second path. Lastly, the plurality of path resources comprises circuitry ($44_1$, $46_2$), responsive to the circuitry for sampling, for establishing a second channel estimate for the second path in response to the first path and the second path.

34 Claims, 2 Drawing Sheets

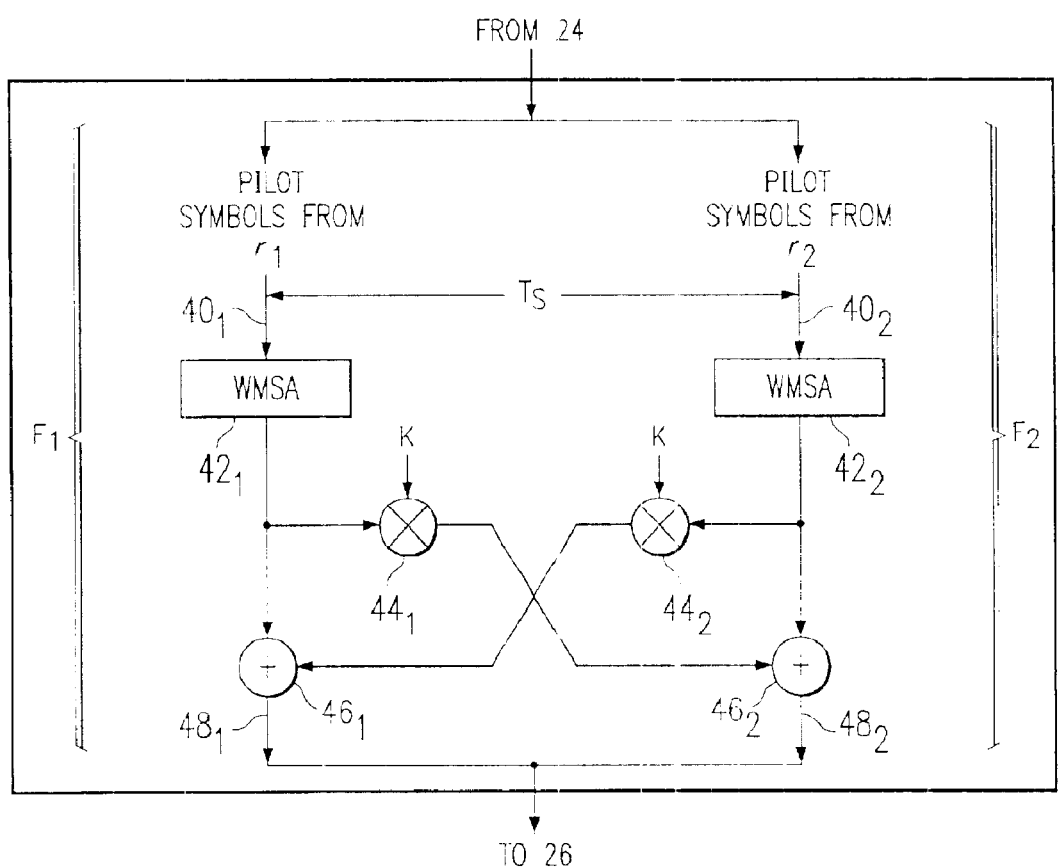

WIRELESS CODE DIVISION MULTIPLE ACCESS COMMUNICATIONS SYSTEM WITH CHANNEL ESTIMATION USING FINGERS WITH SUB-CHIP SPACING

CROSS-REFERENCE TO RELATED APPLICATIONS

This application claims the benefit, under 35 U.S.C. § 119(e)(1), of U.S. Provisional Application No. 60/185,326 (TI-30576PS), filed Feb. 28, 2000.

STATEMENT REGARDING FEDERALLY SPONSORED RESEARCH OR DEVELOPMENT

Not applicable.

BACKGROUND OF THE INVENTION

The present embodiments relate to wireless communications systems and are more particularly directed to improving signal-to-noise ratio ("SNR") by processing signal paths that are relatively close together in time.

Wireless communications have become very prevalent in business, personal, and other applications, and as a result the technology for such communications continues to advance in various areas. One such advancement includes the use of spread spectrum communications, including that of code division multiple access ("CDMA"). CDMA systems are characterized by simultaneous transmission of different data signals over a common channel by assigning each signal a unique code. This unique code is matched with a code of a selected user station within the cell to determine the proper recipient of a data signal.

Wireless networks are now being designed for a variety of devices that are typically within fairly close distances of one another, such as in the range of 10 meters or less. In the current state of the art, such a network is sometimes referred to as a personal area network ("PAN") and it may include, by way of example, a keyboard and a printer, each of which communicates in a wireless manner with a mutual computer that is also part of the PAN. Another type of commonly used wireless network is a cellular telephone system. In such communications, a user station (e.g., a hand held cellular phone) communicates with a base station, where typically the base station corresponds to a "cell." In any event, for both types of systems, other devices also may be implemented, and the term network is used in this document to describe a system consisting of an organized group of any of various types of intercommunicating devices.

CDMA continues to advance along with corresponding standards that have brought forth a next generation wideband CDMA ("WCDMA"). WCDMA includes alternative methods of data transfer, one being time division duplex ("TDD") and another being frequency division duplex ("FDD"). The present embodiments are preferably incorporated in FDD but alternatively also may apply to TDD; thus, both approaches are further introduced here. TDD data are transmitted in one of various different forms, such as quadrature phase shift keyed ("QPSK") symbols or other higher-ordered modulation schemes such as quadrature amplitude modulation ("QAM") or 8 phase shift keying ("PSK"). In any event, the symbols are transmitted in data packets of a predetermined duration or time slot. Within a data frame having 15 of these slots, bi-directional communications are permitted, that is, one or more of the slots may correspond to communications from a base station to a user station while other slots in the same frame may correspond to communications from a user station to a base station. Further, the spreading factor used for TDD is relatively small, whereas FDD may use either a large or small spreading factor. FDD data are comparable in many respects to TDD including the use of 15-slot frames, although FDD permits a different frequency band for uplink communications (i.e., user to base station) versus downlink communications (i.e., base to user station), whereas TDD uses a single frequency in both directions.

Due to various factors including the fact that CDMA communications are along a wireless medium, an originally transmitted communication from a transmitter to a receiver may arrive at the receiver at multiple and different times. Each different arriving signal that is based on the same original communication is said to have a diversity with respect to other arriving signals originating from the same transmitted communication. Further, various diversity types may occur in CDMA communications, and the CDMA art strives to ultimately receive and identify the originally transmitted data by exploiting the effects on each signal that are caused by the one or more diversities affecting the signal. One type of CDMA diversity may occur in many indoor or pedestrian environments because a transmitted signal from a station is reflected by objects that it contacts. For example, in an outdoor environment these objects may be the ground, mountains, and buildings, while in an indoor environment these objects may be walls and furniture. As a result, a same single transmitted communication may arrive at a receiving station at numerous different times, and assuming that each such arrival is sufficiently separated in time, then each different arriving signal is said to travel along a different channel and arrive as a different "path." These multiple signals are referred to in the art as multiple paths or multipaths. Several multipaths may eventually arrive at the receiving station and the channel traveled by each may cause each path to have a different phase, amplitude, and signal-to-noise ratio ("SNR"). Accordingly, for one communication from one station to another station, each multipath is originally a replica of the same originally transmitted data, and each path is said to have time diversity relative to other multipath(s) due to the difference in arrival time which causes different (uncorrelated) fading/noise characteristics for each multipath.

According to the prior art, although multipaths carry the same user data to the receiver, they are separately recognized by the receiver based on the timing of arrival of each multipath to improve performance. More particularly, CDMA communications are modulated using a spreading code which consists of a series of binary pulses, and this code runs at a higher rate than the symbol data rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. Given the transmission of the CDMA signal using chips, then according to the prior art multipaths separated in time by at least one chip are distinguishable at the receiver by assigning a different resource to process each corresponding multipath. Such an operation for large spreading factor FDD communications is often performed by assigning each identified path to a corresponding finger of a rake receiver, where the rake receiver performs what is referred to as a maximal ratio combining ("MRC") operation which combines the various paths taking into account the respective delays of those paths and in view of the low auto-correlations of CDMA codes. Accordingly, given that numerous multipaths may arrive at a receiving user station, the prior art endeavors to select certain of those multipaths and then to perform various processing on those paths in an effort to combine the signals to remove the effects of the diversity and to better recover the originally-transmitted data represented by those signals.

While the preceding prior art operations have proven useful in identifying multipaths for further processing, the present inventors have observed that such an approach yields an SNR that may be improved further. Specifically, the present inventors have observed a drawback in that the prior art approach as described above limits itself to process paths that are at least one chip apart. As described below with respect to the preferred embodiments, additional gains may be achieved in SNR by processing multipaths under an analysis that considers paths that are within one chip of another, that is, they fall within a sub-chip boundary in time.

BRIEF SUMMARY OF THE INVENTION

In the preferred embodiment, there is a wireless communication network. The network comprises a wireless receiver. The receiver comprises at least one antenna for receiving a plurality of frames in a form of a plurality of paths. Each of the plurality of frames is modulated by a plurality of chips, and each chip in the plurality of chips has a like chip duration. The receiver further comprises a plurality of path resources, and this plurality of path resources comprises a first path resource configured to receive a first plurality of symbols from a first path in the plurality of paths and a second path resource configured to receive a second plurality of symbols from a second path in the plurality of paths. The plurality of path resources also comprises circuitry for sampling the second path at a time less than the chip duration from a time when the circuitry for sampling samples the first path. Still further, the plurality of path resources comprise circuitry, responsive to the circuitry for sampling, for establishing a first channel estimate for the first path in response to the first path and the second path. Lastly, the plurality of path resources comprise circuitry, responsive to the circuitry for sampling, for establishing a second channel estimate for the second path in response to the first path and the second path. Other circuits, systems, and methods are also disclosed and claimed.

BRIEF DESCRIPTION OF THE SEVERAL VIEWS OF THE DRAWING

FIG. 2 illustrates a block diagram of the channel estimator in the receiver of FIG. 1.

DETAILED DESCRIPTION OF THE INVENTION

Figure 1:
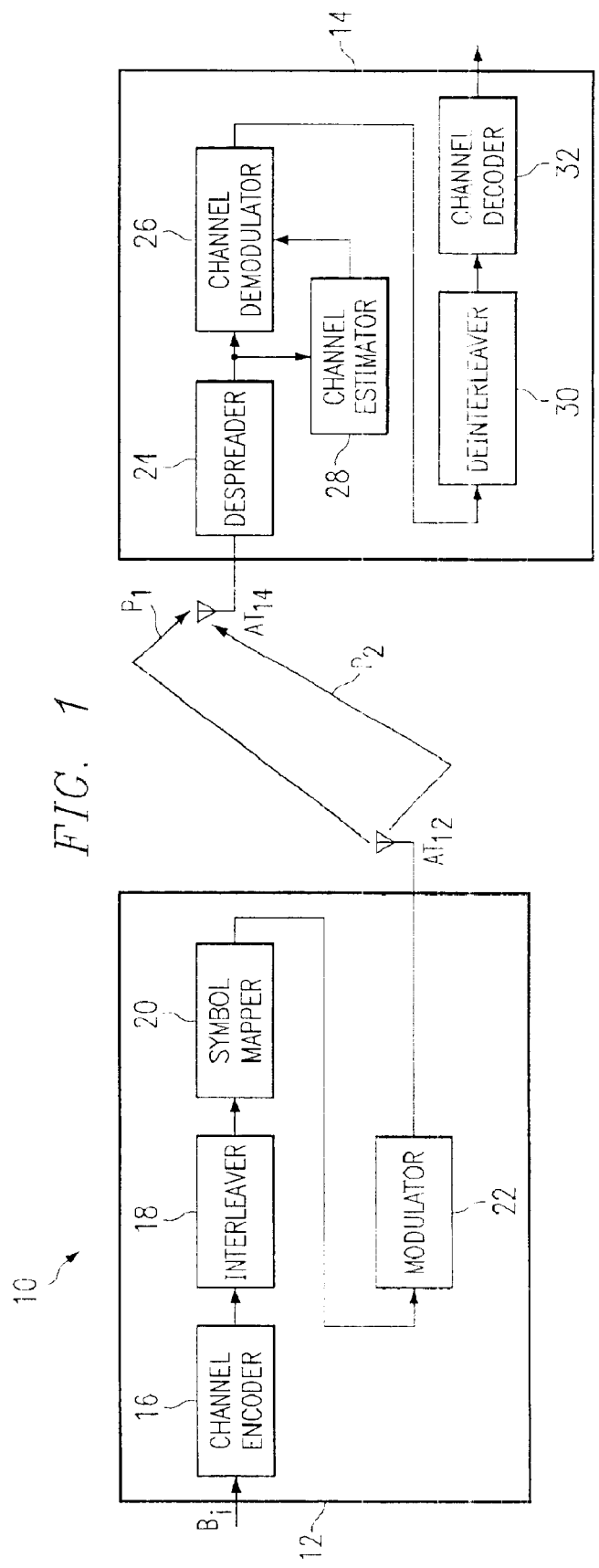
FIG. 1 illustrates a diagram of a wireless communications system by way of a contemporary code division multiple access ("CDMA") or wideband CDMA ("WCDMA") example in which the preferred embodiments may be implemented.

FIG. 1 illustrates a wireless network 10 by way of a contemporary code division multiple access ("CDMA") or wideband CDMA ("WCDMA") example in which the preferred embodiments may be implemented. Network 10 includes two wireless communication devices 12 and 14 by way of example, where one skilled in the art will appreciate from the remaining discussion that numerous other devices may be included in the network. Each device 12 and 14 includes a respective antenna $AT_{12}$ and $AT_{14}$ for communication of CDMA signals, although in alternative embodiments either or both devices could include multiple antennas. Devices 12 and 14 may represent various different wireless devices, such as voice communication devices in a cellular telephone system or computers and computer-peripherals in a personal area network ("PAN"). Also, in the preferred embodiment, communication devices 12 and 14 may be transceivers, or they may be only one of either a transmitter or a receiver. To simplify the remaining illustration, it is assumed that device 12 is a transmitting device while device 14 is a receiving device; thus, for the remainder of this document, these devices are referred to as transmitter 12 and receiver 14, respectively. Lastly, note that either or both of transmitter 12 and receiver 14 may be mobile devices, such as could be the case for a cellular phone or a transportable computing device or peripheral.

For purposes of operation, in general both transmitter 12 and receiver 14 include sufficient transceiver circuitry to communicate packets between one another in a wireless fashion. Some of this circuitry is illustrated and discussed below to better appreciate the preferred embodiments. However, various other circuitry is known in the wireless art and therefore is neither illustrated nor discussed in detail. For the sake of simplifying the discussion, each of transmitter 12 and receiver 14 is discussed separately below.

Transmitter 12 alone is constructed according to the prior art, but its operation in connection with receiver 14 improves the overall performance of network 10 as detailed later. Turning first to transmitter 12, it receives information bits $B_i$ at an input to a channel encoder 16. Channel encoder 16 encodes the information bits $B_1$ in an effort to improve raw bit error rate. Various encoding techniques may be used by channel encoder 16 and as applied to bits $B_1$, with examples including the use of convolutional code, block code, turbo code, concatenated codes, or a combination of any of these codes. The encoded output of channel encoder 16 is coupled to the input of an interleaver 18. Interleaver 18 operates with respect to a block of encoded bits and shuffles the ordering of those bits so that the combination of this operation with the encoding by channel encoder 16 exploits the time diversity of the information. For example, one shuffling technique that may be performed by interleaver 18 is to receive bits in a matrix fashion such that bits are received into a matrix in a row-by-row fashion, and then those bits are output from the matrix to a symbol mapper 20 in a column-by-column fashion. Symbol mapper 20 then converts its input bits to symbols, designated generally as $S_1$. The converted symbols $S_i$ may take various forms, such as quadrature phase shift keying ("QPSK") symbols, binary phase shift keying ("BPSK") symbols, or quadrature amplitude modulation ("QAM") symbols. In any event, symbols $S_i$ may represent various information such as user data symbols, as well as pilot symbols and control symbols such as transmit power control ("TPC") symbols and rate information ("RI") symbols. As detailed later in connection with the preferred embodiments, the transmitted pilot symbols are received and used by receiver 14 to determine channel estimates for paths received on a sub-chip basis.

Continuing with transmitter 12, symbols $S_i$ are coupled from symbol mapper 20 to a modulator 22. Modulator 22 modulates each data symbol by combining it with, or multiplying it times, a CDMA spreading sequence which can be a pseudo-noise ("PN") digital signal or PN code or other spreading codes (i.e., it utilizes spread spectrum technology). In any event, the spreading sequence facilitates simultaneous transmission of information over a common channel by assigning each of the transmitted signals a unique code during transmission. Further, this unique code makes the simultaneously transmitted signals over the same bandwidth distinguishable at receiver 14 (or other receivers). Also, transmitter 12 is assumed to be an open loop transmitter, that is, it may apply a channel correction to its transmission without the benefit of feedback from receiver 14. Alternatively transmitter 12 could implement a closed loop approach whereby feedback is provided from receiver 14 to transmitter 12, in which case transmitter 12 would include additional circuitry (e.g., a multiplier) to apply one or more weights to its transmission based on the information provided in the feedback. The output of modulator 22 may be connected, via an appropriate digital-to-analog interface (not shown), to antenna $AT_{12}$ to communicate the transmitted signals to receiver 14.

Receiver 14 includes various blocks according to the prior art, while receiver 14 is further improved in the preferred embodiment as detailed below. Receiver 14 includes a receive antenna $AT_{14}$ for receiving communications from antenna $AT_{12}$ of transmitter 12. Recall that such communications may pass by various multipaths. In the illustration of FIG. 1, an example of two multipaths are shown, $P_1$ and $P_2$, so that this example may be discussed later to illustrate the preferred embodiment operation. Within receiver 14, signals received by antenna $AT_{14}$ are coupled, via an appropriate analog-to-digital interface (not shown), to a despreader 24. Despreader 24 operates according to known principles, such as by multiplying the CDMA signal times the CDMA code for receiver 14 and resolving the receipt of multipaths, thereby producing a despread symbol stream at its output and at the symbol rate.

The despread signals output by despreader 24 are coupled to a channel demodulator block 26 and to a channel estimator 28, both of which are constructed and operate according to the preferred embodiment. Channel estimator 28 evaluates the pilot symbols in each incoming signal to estimate the effects that have been imposed on those signals by the channel of transmission between transmitter 12 and receiver 14. The pilot symbols may be included within the same channel as the user data symbols or they may be in a separate and parallel channel known in the art as a pilot channel ("PICH"). Additionally, in general in the prior art each path is said to be evaluated by a corresponding finger for purposes of determining the channel estimates. Thus, for two paths, two fingers are used. With respect to paths that are more than one chip apart, these estimates may be determined according to the prior art. However, as a further improvement and as detailed below, the preferred embodiment further modifies channel estimator 28 so that it also determines channel estimates for sub-chip paths, that is, for signals that arrive within one chip duration of one another. The channel estimates from channel estimator 28 are output to channel demodulator 26. In response to receiving the channel estimates, demodulator 26 applies the estimates to the despread user data symbols received from despreader 22 and corresponding to the paths for which the estimates were determined. In this regard, demodulator 26 may operate to implement maximal ratio combining by applying different estimates to each assigned finger of a rake receiver; however, the application of the estimate to the user data may be by way of alternative signal combining methods.

Once demodulator 26 applies the channel estimates to the despread data, its resulting output is thereby improved according to the preferred embodiment; thereafter the output may be processed according to the prior art. Thus, the output is connected to a deinterleaver 30 which operates to perform an inverse of the function of interleaver 18, and the output of deinterleaver 30 is connected to a channel decoder 32. Channel decoder 32 may include a Viterbi decoder, a turbo decoder, a block decoder (e.g., Reed-Solomon decoding), or still other appropriate decoding schemes as known in the art. In any event, channel decoder 32 further decodes the data received at its input, typically operating with respect to certain error correcting codes, and it outputs a resulting stream of decoded symbols. Indeed, note that the probability of error for data input to channel decoder 32 is far greater than that after processing and output by channel decoder 32. For example, under current standards, the probability of error in the output of channel decoder 32 may be between $10^{-3}$ and $10^{-6}$. Finally, the decoded symbol stream output by channel decoder 32 may be received and processed by additional circuitry in receiver 14, although such circuitry is not shown in FIG. 1 so as to simplify the present illustration and discussion.

In various respects, network 10 may operate according to known general techniques for various types of cellular or other spread spectrum communications, including CDMA/WCDMA communications. Such general techniques are known in the art and include the commencement of a communication from transmitter 12 and the receipt and processing of that communication by receiver 14. Other techniques are ascertainable by one skilled in the art. However, to focus on the preferred embodiment, the remaining discussion focuses on the functionality and block circuitry to implement a preferred method of operation with respect to channel estimator 28 for processing sub-chip multipaths, whereby improved SNR is achieved thereby improving the performance of network 12 as a whole. In other words, one aspect of operation of network 10 which is enhanced according to the preferred embodiments relates to the processing of multipaths received by receiver 14 from transmitter 12 where those multipaths arrive at times that are received within one chip from one another. More particularly, one current CDMA transfer rate is 3.84 Mchips/second and, thus, each chip has a duration of 260 ns. Thus, in this example, the preferred embodiments process two or more independent paths that are within the 260 ns single chip duration. Indeed, the ITU models include an Indoor Office Environment and an Outdoor-to-Indoor and Pedestrian Environment, where both models include two or more independent paths that are within 110 ns of each other. The preferred embodiment may process paths according to these models and, indeed, simulation has shown improved SNR performance of network 10 with respect to such models.

As introduced above and as further illustrated below, channel estimator 28 in the preferred embodiment implements a path-processing resource such as a rake receiver having fingers. Each finger is assigned to an incoming independent path, that is, a path corresponding to a different time of receipt. For those paths that arrive within one chip duration of one another, they are processed according to a preferred methodology having the following derivation as developed by the inventors hereof. For the sake of discussion, assume that two fingers in channel estimator 28 have been assigned to the signals corresponding to respective paths $P_1$ and $P_2$, and assume further that paths $P_1$ and $P_2$ arrived at receiver 14 within one chip of one another (e.g., within a 260 ns duration such as paths arriving 110 ns apart according to one of ITU the models introduced earlier). These paths are received as complex signals which include the effects imposed on the path by the channel traveled by each path along with noise. Thus, let the complex amplitude and phase (i.e., the signal term) of the channel effect included within $P_1$ be represented as $\alpha_1$ while the noise term therein is $n_1$, and let the complex amplitude and phase of the channel effect included within $P_2$ be represented as $\alpha_2$ while the noise term therein is $n_2$. Under the preferred embodiment, it is assumed that for these two paths, being within one chip of one another, that the signal terms represented in each path are correlated between the two paths. Thus, the signals, $r_1$ and $r_2$, received by the two fingers of channel estimator 28, and corresponding to the respective paths $P_1$ and $P_2$, may be defined according to the following Equations 1 and 2:

$$r_1 = \alpha_1 + k\alpha_2 + n_1 \qquad \text{Equation 1}$$

$$r_2 = \alpha_2 + k\alpha_1 + n_2 \qquad \text{Equation 2}$$

where k is a constant and is the cross-correlation between the signal terms $r_1$ and $r_2$.

Given Equations 1 and 2, it is the intended purpose of the preferred embodiment for channel estimator 28 to estimate the channel effects within paths $P_1$ and $P_2$ from the pilot symbols in those paths and to provide these estimates to channel demodulator 26. In response, channel demodulator 26 appropriately weights the incoming user data symbols in those paths so that the weighted symbols may be combined to maximize SNR. Typically in the prior art, channel demodulator 26 uses as weights the complex conjugates of the channel estimates provided to it, that is, these complex conjugates are multiplied by channel demodulator 26 times the appropriate input signal from despreader 22. Of course, channel estimator 28 could instead provide the complex conjugates of the channel estimates to channel demodulator 26 in lieu of the actual channel estimates. Let the channel estimates provided by channel estimator 28 for the two signals $r_1$ and $r_2$ be $w_1$ and $w_2$, respectively, which may be represented by the following weight vector, W, as shown in Equation 3. Channel demodulator 26 will take the complex conjugates of $w_1$ and $w_2$ and multiply these values by the appropriate input signal from despreader 24.

$$W = \begin{bmatrix} w_1 \\ w_2 \end{bmatrix} \qquad \text{Equation 3}$$

Next, Equation 4 identifies a matrix $R_1$ that is the cross-correlation between $r_1$ and $r_2$ as pertaining to their complex amplitude and phase terms (i.e., without the noise terms $n_1$ and $n_2$).

$$R_1 \begin{bmatrix} \alpha + k\alpha_2 \\ \alpha_2 + k\alpha_1 \end{bmatrix} \begin{bmatrix} \alpha_1 + k\alpha_2 \\ \alpha_2 + k\alpha_1 \end{bmatrix}^H \qquad \text{Equation 4}$$

Similarly, Equation 5 identifies a matrix $R_2$ that is the cross-correlation between $r_1$ and $r_2$ as pertaining to their noise terms $n_1$ and $n_2$, assuming that the noise terms $n_1$ and $n_2$ have a same cross-correlation represented by $\rho$.

$$R_2 = \begin{bmatrix} 1 & \rho \\ \rho & 1 \end{bmatrix} \qquad \text{Equation 5}$$

Given the preceding assumptions and definitions, then it may be stated according to known principles that SNR is maximized by finding the solution to the following Equation 6.

$$\max \left\{ \frac{W^H R_1 W}{W^H R_2 W} \right\} \qquad \text{Equation 6}$$

Substituting in the previous values and taking the appropriate Hermitian values of the weight vector, then Equation 6 is solved by the following Equation 7:

$$W = \begin{bmatrix} 1 & \rho \\ \rho & 1 \end{bmatrix}^{-1} \begin{bmatrix} \alpha_1 + k\alpha_2 \\ \alpha_2 + k\alpha_1 \end{bmatrix} \qquad \text{Equation 7}$$

$$= \frac{1}{1-\rho^2} \begin{bmatrix} (1-k\rho)\alpha_1 + (k-\rho)\alpha_2 \\ (k-\rho)\alpha_1 + (1-k\rho)\alpha_2 \end{bmatrix}$$

Next, under the preferred embodiment, since the two fingers receiving $r_1$ and $r_2$ are relatively close together in time (i.e., within one chip), then it is assumed that the cross-correlation, k, between signal terms is approximately equal to the cross-correlation, $\rho$, between noise terms. Thus, letting $\rho = k$ and substituting it in Equation 7 for $\rho$ yields the following Equation 8:

$$W \approx \frac{1}{1-k^2} \begin{bmatrix} (1-k^2)\alpha_1 + (k-k)\alpha_2 \\ (k-k)\alpha_1 + (1-k^2)\alpha_2 \end{bmatrix} \qquad \text{Equation 8}$$

$$= \frac{1}{1-k^2} \begin{bmatrix} (1-k^2)\alpha_1 + 0 \\ 0 + (1-k^2)\alpha_2 \end{bmatrix}$$

$$= \begin{bmatrix} \alpha_1 \\ \alpha_2 \end{bmatrix}$$

Equation 8 therefore demonstrates that each finger should be weighted by the complex conjugate of the complex amplitude and path tracked by the signal assigned to the finger, even if the fingers are assigned to signals that are closer than one chip apart.

Given the preceding and recognizing that receiver 14 will receive signals $r_1$ and $r_2$, Equation 8 suggests that from the received signals it is the goal of channel estimator 28 to determine estimated values for $\alpha_1$ and $\alpha_2$ so that those values may be used by channel demodulator 26 to weight the incoming user data symbols. For the sake of reference, let the estimated values for $\alpha_1$ and $\alpha_2$ be indicated as estimated values $\hat{\alpha}_1$ and $\hat{\alpha}_2$, respectively. According to the preferred embodiment, such values may be estimated by additional manipulations of Equations 1 and 2, as is developed below.

Multiplying Equation 1 times the value of k yields the following Equation 9:

$$kr_1 = k\alpha_1 + k^2\alpha_2 + kn_1 \qquad \text{Equation 9}$$

Next, Equation 2 may be subtracted from Equation 9 yielding the following Equation 10:

$$kr_1 - r_2 = k\alpha_1 + k^2\alpha_2 + kn_1 - \alpha_2 - k\alpha_1 - n_2 = k^2\alpha_2 - \alpha_2 + kn_1 - n_2 = \alpha_2(k^2-1) + kn_1 - n_2 \qquad \text{Equation 10}$$

Solving Equation 10 for $\alpha_2$ yields the following Equation 11:

$$\alpha_2 = \frac{kr_1 - r_2 - kn_1 + n_2}{(k^2 - 1)} \qquad \text{Equation 11}$$

While Equation 11 therefore provides a value for $\alpha_2$, an estimate of that value, which as mentioned above is herein designated as $\hat{\alpha}_2$, is formed according to the preferred embodiment by removing the contributions of noise (i.e., by disregarding the values in Equation 11 pertaining to $n_1$ and $n_2$). As a result, the value of $\hat{\alpha}_2$ is therefore established by the following Equation 12:

$$\hat{\alpha}_2 = \frac{kr_1 - r_2}{(k^2 - 1)} = \frac{r_2 - kr_1}{(1 - k^2)} \qquad \text{Equation 12}$$

Without repeating the level of detail of Equations 10 and 11, one skilled in the art also may comparably solve for $\alpha_1$ in terms of $r_1$, $r_2$, $n_1$, and $n_2$, and again disregarding the noise terms it would be shown that $\alpha_1$ may be estimated as shown in the following Equation 13:

$$\hat{\alpha}_1 = \frac{r_1 - kr_2}{(1 - k^2)} \qquad \text{Equation 13}$$

From Equations 12 and 13 and given the assumption of Equation 8, the weight vector of Equation 3 may be re-written as in the following Equation 14:

$$\begin{bmatrix} \hat{\alpha}_1 \\ \hat{\alpha}_2 \end{bmatrix} = \frac{1}{1-k^2} \begin{bmatrix} r_1 - kr_2 \\ r_2 - kr_1 \end{bmatrix} \qquad \text{Equation 14}$$

FIG. 2 illustrates a block diagram of a preferred embodiment for implementing the functionality represented by Equation 14 into channel estimator 28, thereby providing channel estimates $\hat{\alpha}_1$ and $\hat{\alpha}_2$ from the received signals $r_1$ and $r_2$, respectively. Channel estimator 28 generally includes two signal processing resources or "fingers" $F_1$ and $F_2$, where each such resource corresponds to the channel estimate determination for a corresponding received signal $r_1$ and $r_2$. Looking at these fingers, they include respective inputs $40_1$ and $40_2$ for receiving sampled signals $r_1$ and $r_2$ from the output of despreader 24. The time for sampling signals $r_1$ and $r_2$ is separated by a duration indicated as $T_s$ which, in the preferred embodiment, is equal to one-half the duration of a chip as further explored later.

In the preferred embodiment, each of inputs $40_1$ and $40_2$ couples the pilot symbols corresponding to the respective input signals $r_1$ and $r_2$ into a respective weighted multi-slot averaging ("WMSA") block $42_1$ and $42_2$. As stated before, the pilot symbols may either be time-multiplexed with the data symbols or may be transmitted with a different Walsh code (pilot symbols sent on the PICH). WMSA is a technique known in the art and, indeed, is used in the prior art in combination with channel estimation with respect to paths received more than one chip apart. Under WMSA, channel estimates are determined from pilot symbols and those estimates are averaged and then applied to user data symbols. More particularly, different weights are applied to the estimates so that the estimates corresponding to pilot symbols received closer in time (or at the same time for PICH) to the data symbols are weighted more heavily than for pilot symbols received at a greater distance in time either before or after the data symbols. Alternatively, however, if channel estimates are made using the PICH, then in the preferred embodiment a simple averaging is applied to all pilot symbols by using an equal weight for each pilot symbol since the pilot symbols being averaged are all close in time to the data symbols. Returning to the case of weighted multi-slot averaging as illustrated in FIG. 2 and more particularly to WMSA blocks $42_1$ and $42_2$, they therefore represent a stage of noise reduction to the received pilot symbols corresponding to signals $r_1$ and $r_2$. Note further that this operation therefore preferably beats down noise in the processed signals, and this operation is thus consistent with the assumption made in connection with Equation 12 whereby noise is disregarded to determine the estimated channel effect.

Each of the outputs of WMSA blocks $42_1$ and $42_2$ is connected to two different functions. For example with respect to WMSA block $42_1$, its output is connected as a multiplicand to a multiplier $44_1$ and as an addend to an adder $46_1$. Similarly, with respect to WMSA block $44_2$, its output is connected as a multiplicand to a multiplier $44_2$ and as an addend to an adder $46_2$. Each of multipliers $44_1$ and $44_2$ also receives as a multiplicand the value of $-k$. The output of multiplier $44_1$ is connected as an additional input to adder $46_2$, while the output of multiplier $44_2$ is connected as an additional input to adder $46_1$. Given the connections with respect to the illustrated multipliers and adders, one skilled in the art will therefore appreciate that the sum output $48_1$ from adder $46_1$, provides $\hat{\alpha}_1$ which is the numerator of the result from Equation 13 (given the added effect of WMSA blocks $42_1$ and $42_2$) and the sum output $48_2$ from adder $46_2$ provides $\hat{\alpha}_2$ which is the numerator of the result from Equation 12 (given the added effect of WMSA blocks $42_1$ and $42_2$). Further, since Equations 12 and 13 have a common denominator (as also shown in Equation 14), then that term may be excluded as to both $\hat{\alpha}_1$ and $\hat{\alpha}_2$ with an equal effect. Lastly, since outputs $48_1$ and $48_2$ provide the channel estimates $\hat{\alpha}_1$ and $\hat{\alpha}_2$, they are connected as an output to channel demodulator 26.

Having illustrated in FIG. 2 a preferred embodiment of channel estimator 28 for providing channel estimates $\hat{\alpha}_1$ and $\hat{\alpha}_2$ from the received signals $r_1$ and $r_2$, respectively, note that such an embodiment necessarily requires a value for k to determine the channel estimates. Recalling that k represents the cross-correlation between the signal terms of the received signals, such a value may be derived based on the distance of time between the two received signals. For example, in one preferred embodiment of implementing channel estimator 28 of FIG. 2, inputs $40_1$ and $40_2$ are established to sample the incoming signal at a duration, $T_s$, equal to one-half chip, that is, $r_1$ and $r_2$ will be sampled at times that are one-half chip apart. Thus, in the earlier example where one chip duration equals 260 ns, then $T_s$=130 ns (i.e., 260 ns×½=130 ns). Moreover, in the preferred embodiment both transmitter 12 and receiver 14 include a respective filter according to the prior art and having a function characterized as a root raised cosine. Thus, when the functions of both filters are convolved with one another, the result is only the raised cosine. Given this result, one skilled in the art may compute the correlation k between a first path transmitted at a first time and a second path transmitted at a second time which is one-half chip after the first time (irrespective of the actual duration of the chip). For such an instance, k is found to equal 0.6. This computation is as follows. The pulse x(t) having the raised cosine spectrum is shown in the following Equation 15:

$$x(t) = \frac{\sin(\pi t/T)}{\pi t/T} \frac{\cos(\pi \beta t/T)}{1 - 4\beta^2 t^2/T^2} \qquad \text{Equation 15}$$

where β is the excess bandwidth (which is 0.22 in WCDMA systems) and T is the chip period. The value of x(T/2) is the value of the pulse half a chip away from the maximum. Evaluating Equation 15, we get k=x(T/2)=0.629, or k is approximately equal to 0.6.

When implementing a value of k=0.6 into channel estimator 28 of FIG. 2, one skilled in the art may readily confirm that the channel estimate $\hat{\alpha}_1$ is responsive to the respective received signal $r_1$ (after the WMSA operation) minus 60 percent (i.e., k=0.6=60%) of the other signal, $r_2$, which is received at a time that is one-half chip away from the respective received signal, $r_1$. Similarly, the channel estimate $\hat{\alpha}_2$ is responsive to the respective received signal $r_2$ (after the WMSA operation) minus 60 percent of the other signal, $r_1$, which is received at a time that is one-half chip away from the respective received signal, $r_2$. Indeed, simulation results have demonstrated for a value of k=0.6 and in an example where a Doppler rate of 5 Hz exists on a signal (e.g., because one of the devices is moving) and where two equal power paths are present which are one-half chip apart, then using WMSA with 6-slot averaging for the WMSA function in FIG. 2 a gain in 6.1 dB is achieved using the implementation of FIG. 2.

Alternative embodiments also may be implemented and which should be further appreciated from the above. For example, the value of k may be adjusted for various reasons. One such reason may be a change in $T_s$, in which case a different value of k may be determined and implemented. In this case, the approach illustrated in FIG. 2 still realizes the channel estimates shown in equation form at outputs $48_1$ and $48_2$, where each channel estimate is therefore responsive to a respective signal (which may have been noise processed such as through WMSA) minus a factor k multiplied times another signal received within one chip of the respective signal. Moreover, in still another approach, either or both of $T_s$ and k may be dynamically adjusted, where it is contemplated that SNR would be improved for values of k between 0.2 and 0.8.

From the above, it may be appreciated that the above embodiments provide a wireless communication network including a transmitter and receiver, wherein the transmitter communicates frames that are modulated with chips and which include pilot symbols and user data symbols. Paths are periodically sampled by the receiver and, more particularly, at least some of the paths are preferably sampled at a duration less than the duration of a chip (i.e., at a sub-chip rate). Channel estimates are determined by the receiver from pilot symbols in the sub-chip sampled paths, where an estimate is found by subtracting from a given received signal a portion of another signal that is received within one chip duration of the given received signal. The channel estimates are then applied to the user data in the path corresponding to the channel estimate. As a result of this approach, SNR between the communicating devices is improved, thereby improving overall network performance. Further, while the present embodiments have been described in detail, various substitutions, modifications or alterations could be made to the descriptions set forth above without departing from the inventive scope. For example, while the preceding illustrations have been with respect to only two paths within a one chip duration, the inventive teachings may be expanded to a greater number of paths. As another example, while WCDMA has been demonstrated as the preferred wireless environment, other wireless systems may implement the preferred embodiment. Thus, these examples as well as others ascertainable by one skilled in the art further illustrate the inventive scope, as defined by the following claims.

What is claimed is:

1. A wireless communication network, comprising:
   a wireless receiver, comprising:
      at least one antenna for receiving a plurality of frames in a form of a plurality of paths;
      wherein each of the plurality of frames is modulated by a plurality of chips;
      wherein each chip in the plurality of chips has chip duration;
      a plurality of path resources, comprising;
         a first path resource configured to receive a first plurality of symbols from a first path in the plurality of paths; and
         a second path resource configured to receive a second plurality of symbols from a second path in the plurality of paths;
         circuitry for sampling the second path at a time less than the chip duration from a time when the circuitry for sampling samples the first path;
         circuitry, responsive to the circuitry for sampling, for establishing a first channel estimate for the first path in response to the first path and the second path; and
         circuitry, responsive to the circuitry for sampling, for establishing a second channel estimate for the second path in response to the first path and the second path.

2. The network of claim 1 wherein the first channel estimate is responsive to a first signal corresponding to the first path minus a factor multiplied times a second signal corresponding to the second path.

3. The network of claim 2 wherein the second channel estimate is responsive to the second signal corresponding to the second path minus the factor multiplied times the first signal corresponding to the first path.

4. The network of claim 3 wherein the factor is greater than or equal to 0.2 and less than or equal to 0.8.

5. The network of claim 4:
   wherein the first signal corresponding to the first path comprises a plurality of pilot symbols received from the first path; and
   wherein the first channel estimate is responsive to the first signal in that the plurality of pilot symbols received from the first path are processed by averaging;
   wherein the second signal corresponding to the second path comprises a plurality of pilot symbols received from the second path; and
   wherein the second channel estimate is responsive to the second signal in that the plurality of pilot symbols received from the second path are processed by averaging.

6. The network of claim 5:
wherein the first channel estimate is responsive to the first signal in that the plurality of pilot symbols received from the first path are processed by multi-slot weighted averaging; and
   wherein the second channel estimate is responsive to the second signal in that the plurality of pilot symbols received from the second path are processed by multi-slot weighted averaging.

7. The network of claim 5 wherein the receiver further comprises:
   circuitry for applying the first channel estimate to user data symbols in the first path; and
   circuitry for applying the second channel estimate to user data symbols in the second path.

8. The network of claim 7 wherein the circuitry for applying the first channel estimate and the circuitry for applying the second channel estimate comprises maximal ratio combining circuitry.

9. The network of claim 3 wherein the second path is sampled by the circuitry for sampling at approximately one-half the chip duration from a time when the circuitry for sampling samples the first path.

10. The network of claim 8 wherein the factor equals approximately 0.6.

11. The network of claim 9:
   wherein the first signal corresponding to the first path comprises a plurality of pilot symbols received from the first path; and
   wherein the first channel estimate is responsive to the first signal in that the plurality of pilot symbols received from the first path are processed by averaging;
   wherein the second signal corresponding to the second path comprises a plurality of pilot symbols received from the second path; and
   wherein the second channel estimate is responsive to the second signal in that the plurality of pilot symbols received from the second path are processed by averaging.

12. The network of claim 11:
wherein the first channel estimate is responsive to the first signal in that the plurality of pilot symbols received from the first path are processed by multi-slot weighted averaging; and
   wherein the second channel estimate is responsive to the second signal in that the plurality of pilot symbols received from the second path are processed by multi-slot weighted averaging.

13. The network of claim 11 wherein the receiver further comprises:
   circuitry for applying the first channel estimate to user data symbols in the first path; and circuitry for applying the second channel estimate to user data symbols in the second path.

14. The network of claim 13 wherein the circuitry for applying the first channel estimate and the circuitry for applying the second channel estimate comprises maximal ratio combining circuitry.

15. The network of claim 3 wherein the second path is sampled by the circuitry for sampling at a sampling time, relative to a time when the circuitry for sampling samples the first path time, which is dynamically adjusted between a value greater than zero and less than the chip duration.

16. The network of claim 15 wherein the factor is dynamically adjusted in response to the sampling time.

17. The network of claim 1 wherein the second path is sampled by the circuitry for sampling at a sampling time, relative to a time when the circuitry for sampling samples at the first path time, which is dynamically adjusted between a value greater than zero and less than the chip duration.

18. The network of claim 1:
wherein the first signal corresponding to the first path comprises a plurality of pilot symbols received from the first path; and
wherein the first channel estimate is responsive to the first signal in that the plurality of pilot symbols received from the first path are processed by averaging;
wherein the second signal corresponding to the second path comprises a plurality of pilot symbols received from the second path; and
wherein the second channel estimate is responsive to the second signal in that the plurality of pilot symbols received from the second path are processed by averaging.

19. The network of claim 18:
wherein the first channel estimate is responsive to the first signal in that the plurality of pilot symbols received from the first path are processed by multi-slot weighted averaging; and
wherein the second channel estimate is responsive to the second signal in that the plurality of pilot symbols received from the second path are processed by multi-slot weighted averaging.

20. The network of claim 1 wherein the receiver further comprises:
circuitry for applying the first channel estimate to user data symbols in the first path; and
circuitry for applying the second channel estimate to user data symbols in the second path.

21. The network of claim 1 and further comprising a wireless transmitter for transmitting the plurality of frames.

22. The network of claim 1 wherein the plurality of frames comprise time division duplex frames.

23. The network of claim 1 wherein the plurality of frames comprise frequency division duplex frames.

24. The network of claim 1 wherein the receiver comprises a CMDA receiver.

25. The network of claim 1 wherein the receiver comprises a WCMDA receiver.

26. A method of operating a wireless communication network, comprising the steps of:
receiving a plurality of frames in a form of a plurality of paths at a wireless receiver comprising at least one antenna for receiving the plurality of frames;
wherein each of the plurality of frames is modulated by a plurality of chips;
wherein each chip in the plurality of chips has chip duration;
a plurality of path resources, comprising;
receiving a first plurality of symbols from a first path in the plurality of paths along a first path resource in the receiver; and
receiving a second plurality of symbols from a second path in the plurality of paths along a second path resource in the receiver;
sampling the second path at a time less than the chip duration from a time when the circuitry for sampling samples the first path;
responsive to sampling step, establishing a first channel estimate for the first path in response to the first path and the second path; and
responsive to the sampling step, establishing a second channel estimate for the second path in response to the first path and the second path.

27. The method of claim 26 wherein the first channel estimate is responsive to a first signal corresponding to the first path minus a factor multiplied times a second signal corresponding to the second path.

28. The method of claim 27 wherein the second channel estimate is responsive to the second signal corresponding to the second path minus the factor multiplied times the first signal corresponding to the first path.

29. The method of claim 28 wherein the factor is greater than or equal to 0.2 and less than or equal to 0.8.

30. The method of claim 29:
wherein the first signal corresponding to the first path comprises a plurality of pilot symbols received from the first path; and
wherein the first channel estimate is responsive to the first signal in that the plurality of pilot symbols received from the first path are processed by averaging;
wherein the second signal corresponding to the second path comprises a plurality of pilot symbols received from the second path; and
wherein the second channel estimate is responsive to the second signal in that the plurality of pilot symbols received from the second path are processed by averaging.

31. The method of claim 30:
wherein the first channel estimate is responsive to the first signal in that the plurality of pilot symbols received from the first path are processed by multi-slot weighted averaging; and
wherein the second channel estimate is responsive to the second signal in that the plurality of pilot symbols received from the second path are processed by multi-slot weighted averaging.

32. The method of claim 30 and further comprising the steps of:
applying the first channel estimate to user data symbols in the first path; and
applying the second channel estimate to user data symbols in the second path.

33. The method of claim 28 wherein the second path is sampled by the circuitry for sampling at approximately one-half the chip duration from a time when the circuitry for sampling samples the first path.

34. The method of claim 26 and further comprising the step of transmitting the plurality of frames from a transmitter to the receiver.

* * * * *